United States Patent [19]

Hart

[11] Patent Number: 5,243,814

[45] Date of Patent: * Sep. 14, 1993

[54] CABLE RETENTION DEVICE FOR USE WITH A CABLE HANDLING CHAIN

[75] Inventor: Anthony J. Hart, Arnold, England

[73] Assignee: Mansign Engineering Limited, Nottingham, England

[*] Notice: The portion of the term of this patent subsequent to Jul. 2, 2008 has been disclaimed.

[21] Appl. No.: 715,595

[22] Filed: Jun. 14, 1991

Related U.S. Application Data

[63] Continuation of Ser. No. 477,245, Feb. 8, 1990, Pat. No. 5,027,595.

[30] Foreign Application Priority Data

Feb. 9, 1989 [GB] United Kingdom ............... 8902850
May 17, 1989 [GB] United Kingdom ............... 8911338

[51] Int. Cl.⁵ ............................................. F16G 13/16
[52] U.S. Cl. ................................. 59/78.1; 59/900; 248/49
[58] Field of Search ............... 59/78.1, 900; 248/49, 248/50, 51, 78

[56] References Cited

U.S. PATENT DOCUMENTS

| | | | |
|---|---|---|---|
| 3,473,769 | 10/1969 | James | 59/78.1 |
| 4,852,342 | 8/1989 | Hart | 59/78.1 |
| 4,885,908 | 12/1989 | Stohr | 59/78.1 |
| 5,027,595 | 7/1991 | Hart | 59/78.1 |

FOREIGN PATENT DOCUMENTS

| | | | |
|---|---|---|---|
| 1273952 | 7/1968 | Fed. Rep. of Germany | 59/78.1 |
| 8213664.5 | 8/1982 | Fed. Rep. of Germany | 59/78.1 |
| 2111634A | 7/1983 | United Kingdom | 59/78.1 |

OTHER PUBLICATIONS

Murrplastik, "Plastic Support for Cables and Conduit", SR 3000, Jan. 1985, pp. 5211–5214.

Primary Examiner—David Jones
Attorney, Agent, or Firm—Jones & Askew

[57] ABSTRACT

A cable handling chain link including an open sided cable compartment defined between an upper wall, a lower wall and a partition extending between the upper and lower walls, the partition being located in board from the side edges of the upper and lower walls which side edges define the open side of the compartment, and a cable retention device releasably connectable to the chain link, the cable retention device being a unitary member of generally elongate form having an abutment face which abuts against the inside face of one of said walls, and having a resilient tongue formation which co-operates with said inside face and a reaction means formed on the chain link to resiliently urge said abutment face into contact with said inside face, detent means on said abutment face and/or said tongue for co-operation with the chain link to restrain longitudinal withdrawal of the retention device and a lateral projection extending laterally away from said abutment face toward the opposite wall, said lateral projection acting to retain cables within said compartment.

8 Claims, 2 Drawing Sheets

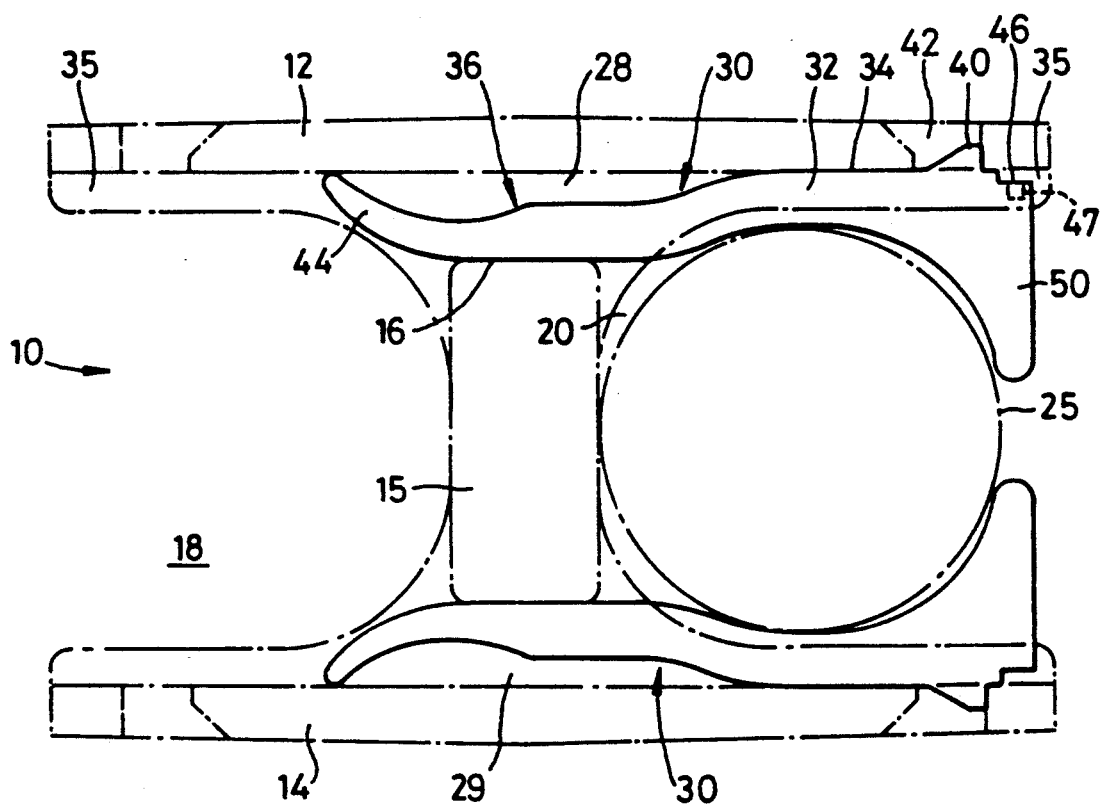
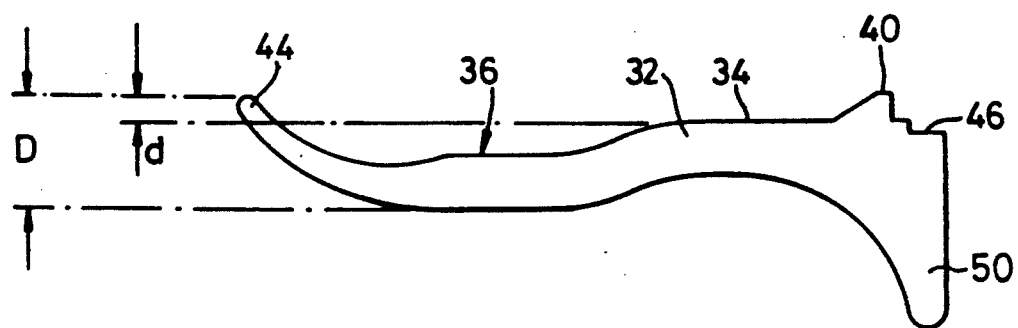

CABLE RETENTION DEVICE FOR USE WITH A CABLE HANDLING CHAIN

This is a continuation of application Ser. No. 07/477,245, filed Feb. 8, 1990, now U.S. Pat. No. 5,027,595.

The present invention relates to a cable retention device for use with a cable handling chain and to the cable handling chain including such a retention device.

In our UK patent 2076107 B we describe a cable handling chain which is assembled from chain links.

The retention device of the present invention is primarily intended for use with the chain link constructed predominantly from a plastics material described in UK patent 2076107 and so reference should be made thereto for a detailed description and understanding of the chain link.

According to one aspect of the present invention there is provided a cable handling chain link including an open sided cable compartment defined between an upper wall, a lower wall and a partition extending between the upper and lower walls, the partition being located in board from the side edges of the upper and lower walls which side edges define the open side of the compartment, and a cable retention device releasably connectable to the chain link, the cable retention device being a unitary member of generally elongate form having an abutment face which abuts against the inside face of one of said walls, and having a resilient tongue formation which co-operates with said inside face and a reaction means formed on the chain link to resiliently urge said abutment face into contact with said inside face, detent means on said abutment face and/or said tongue for co-operation with the chain link to restrain longitudinal withdrawal of the retention device and a lateral projection extending laterally away from said abutment face toward the opposite wall, said lateral projection acting to retain cables within said compartment.

Preferably said inside face is provided with a guide channel for guiding longitudinal movement of the retention device.

Preferably the partition is provided with an aperture adjacent to said inside face, the wall of the aperture opposed to said inside face defining said reaction means.

According to another aspect of the invention there is provided a retention device for a cable handling chain link, the retention device being an elongate unitary member formed from a suitable plastics material.

Various aspects of the present invention are hereinafter described with reference to the accompanying drawings in which:

FIG. 1 is a diagrammatic cross-sectional view of a chain link including a pair of cable retention devices according to one embodiment of the present invention.

FIG. 2 is a side view of one of the retention devices shown in FIG. 1 illustrated in a relaxed condition.

Figure 3:
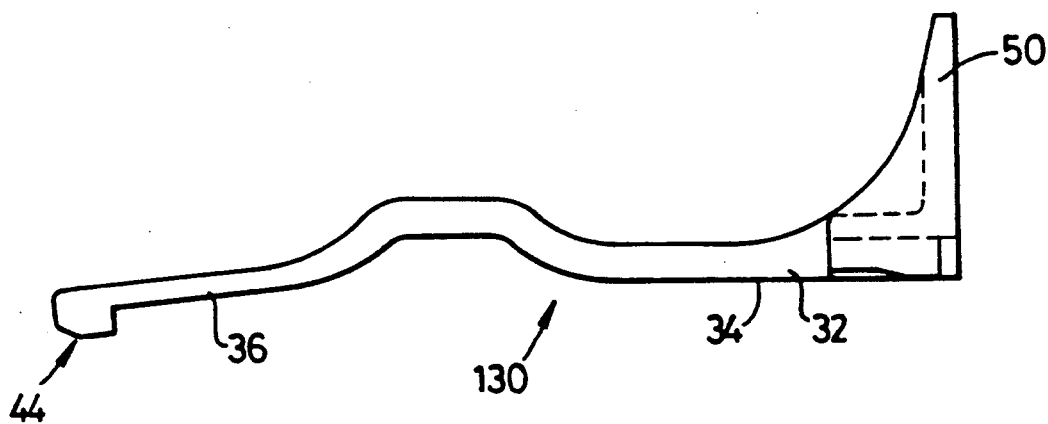
FIG. 3 is a side view of an alternative embodiment of a retention device shown in a relaxed condition.

The chain link 10 includes an upper wall 12 and a lower wall 14. The upper and lower walls 12,14 are connected to one another and spaced apart by a partition wall 15.

The partition wall 15 is located in between the opposed ends of the upper and lower walls such that two open sided compartments 18,20 are defined for reception of cables.

In the illustrated embodiment a cable 25 is illustrated as being located in compartment 20 whereas compartment 18 is shown as being empty. The partition 15 is provided with a through bore 28 located adjacent to the upper wall and a through bore 29 located adjacent to the lower wall.

A pair of retention devices 30 are shown in FIG. 1, one retention device 30 being located adjacent the upper wall and the other retention device being located adjacent the lower wall. Both retention devices 30 are of the same construction and operate in the same way. Accordingly construction and function of each retention device will be described below with reference to the upper retention device 30.

The retention device 30 is generally an elongate unitary member which is formed from a resilient material, preferably a suitable plastics material such as Nylon (registered trade mark). The plastics material may or may not be filled with reinforcement materials.

The retention device 30 is illustrated in FIG. 1 in its cable retention position and includes a main body portion 32 having an abutment face 34 which is in abutment with the inside face of the upper wall.

A tongue portion 36 extends longitudinally from the body portion 32 and is arranged to co-operate with the link so as to resiliently urge the abutment face 34 into abutment with the inside face of the upper wall.

The body portion is provided with a detent formation 40 which in the illustrated embodiment is in the form of a projection. The detent formation 40 locates into an aperture 42 formed in the upper wall and serves to restrain longitudinal withdrawal of the retention device from the chain link. In order to remove the retention device the body is deflected against the bias of the tongue to move the detent out of the aperture 42 and whilst in this deflected position longitudinal withdrawal is then possible.

Longitudinal movement of the device 30 is guided by a guide channel 35 formed on the inside face of the upper wall 12. A similar channel 35 is provided on the lower wall 14.

Deflection of the body can be achieved by pressing a suitable tool through the aperture 42 from the outside or inserting a suitable tool into the recess 46 and levering against the inside of the upper wall. A notch 47 may be provided so that during the levering motion, the tool also engages the notch and causes longitudinal displacement of the device 30.

The tongue portion 36 acts to bias the body into contact with the upper wall by a cantilever action which is achieved by the tongue portion passing through the bore or aperture 28. The tongue portion 36 when in a relaxed state has a lateral dimension d which extends beyond the boundary of the abutment face and, in addition, has an overall width D which is greater than the spacing between the inside face of the upper wall and the opposed face 16 of the bore 28. Accordingly as the device 30 is inserted longitudinally, the tongue portion 36 is resiliently deformed as it is pushed through the bore 28 by engagement between face 16 and the inside face of the upper wall. The terminal end portion 44 of the tongue portion 36 engages the inside face of the upper wall at a location spaced laterally on the opposite side of the partition wall 15 to the body portion 32 and thereby produces a downwardly directed force urging the device to pivot about face 16.

The face 16 thereby acts as a reaction means against which the device can co-operate to urge the abutment face 34 into contact with the inside face of the upper wall. The reaction means is conveniently formed by the face 16 which is part of the partition wall but it will be appreciated that the reaction means could be defined by a member which is not part of the partition wall. The body portion 32 is provided with a lateral projection 50 which extends toward the opposite wall and thereby provides a restriction to the open side of the cable compartment 20 in order to retain cable 25 within the compartment.

In FIG. 1, two retention devices 30 are illustrated. It is envisaged that a single device 30 need only be necessary per chain link, particularly if the length of the lateral projection 50 is extended.

Figure 4:
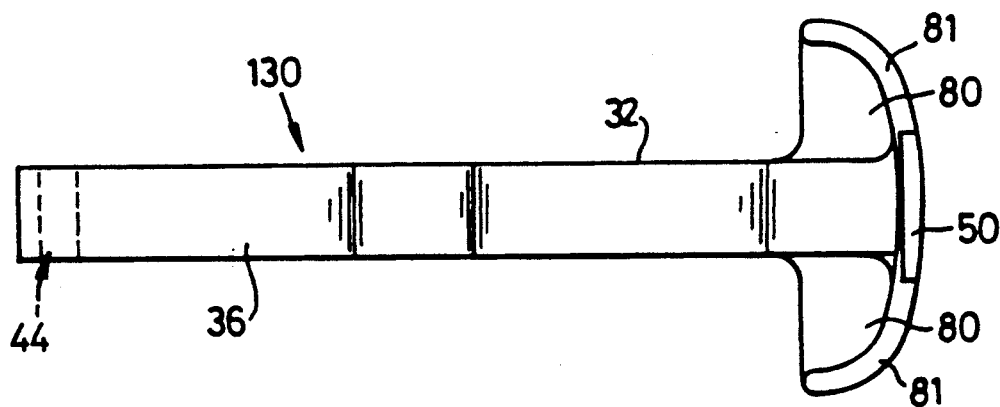
FIG. 4 is a plan view of the retention device shown in FIG. 3.

An alternative retention device 130 is illustrated in FIGS. 3 and 4. The retention device 130 is similar to the retention device 30 and similar parts have been designated by the same reference numerals.

In the retention device 130 the detent formation 40 is formed on the terminal end of tongue portion 36, the tongue portion 36 being longer for retention device 130 to enable the detent formation 40 to engage in the aperture 42 formed in the wall 12, 14 on the side of the partition wall 15 opposite to that where the body portion 32 is located.

As seen in FIG. 4, the body portion 32 is provided with a pair of laterally extending support arms 80. Arms 80 have raised wall portions 81 having upper sides which act as deflecting guides for reducing the likelihood of snagging with external objects during haulage of the chain.

It will be appreciated that of desired detent formation 40 may be provided on both the abutment face 34 and the tongue portion 36.

I claim:

1. A cable handling chain link comprising:
    an open sided cable compartment defined between an upper wall, a lower wall, and a side wall extending between the upper and lower walls;
    the side wall being located inboard from side edges of the upper and lower walls and the side edges defining an open side of the compartment;
    at least one of the upper or lower walls of the compartment having a first detent means formed thereon adjacent to said side edges;
    a cable retention device releasably housed in said compartment, the cable retention device being slidably insertable into and withdrawable from said compartment through said open side;
    the cable retention device being a unitary member formed from a resilient material;
    the unitary member including a body which when inserted into the chain link extends from the side wall to the side edges, the body having an inner end engageable with the side adjacent the outer end and resiliently urged into co-operation with said first detent means for co-operation with the chain link to restrain longitudinal withdrawal of the retention device from the compartment; and
    the body further including a lateral projection which extends laterally across said open side of the compartment in order to retain cables within said compartment.

2. A chain link according to claim 1 wherein the second detent means comprises a projection projecting from said body and the first detent means comprises an aperture formed in one of said upper or lower wall.

3. A chain link according to claim 3 wherein a recess is provided adjacent the projection to enable a tool to be inserted between the retention device and adjacent wall of the compartment for causing deflection of the body and thereby cause withdrawal of said projection from said aperture.

4. A chain link according to claim 3 wherein a notch is provided in the retention device adjacent to said recess, the notch co-operating with said tool to cause longitudinal displacement of the retention device.

5. A chain link according to claim 1 wherein the lateral projection also extends laterally in opposite directions from both sides of the retention device, and wherein upper sides of the lateral projection define deflection guides for reducing snagging.

6. A chain link according to claim 1 wherein said body includes an elongate portion and an adjacent wall of the compartment includes a guide channel for guiding longitudinal movement of the retention device.

7. A chain link according to claim 1 wherein the lateral projection is located inboard of said side edges when the retention device is housed within the compartment.

8. A chain link according to claim 1 wherein the retention device is a unitary body molded from a plastics material.

* * * * *